(12) United States Patent
Yin et al.

(10) Patent No.: US 12,720,001 B2
(45) Date of Patent: Aug. 25, 2026

(54) SPECIAL EFFECT PROCESSING METHOD, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Xunpeng Yin, Beijing (CN); Ziyue Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 18/988,744

(22) Filed: Dec. 19, 2024

(65) Prior Publication Data

US 2025/0294113 A1 Sep. 18, 2025

(30) Foreign Application Priority Data

Mar. 12, 2024 (CN) ......................... 202410282290.7

(51) Int. Cl.
*H04N 5/262* (2006.01)

(52) U.S. Cl.
CPC ................................. *H04N 5/2621* (2013.01)

(58) Field of Classification Search
CPC ....... H04N 5/265; H04N 5/262; H04N 5/2621
USPC .......................................................... 348/239
See application file for complete search history.

(56) References Cited

U.S. PATENT DOCUMENTS

| | | | | |
|---|---|---|---|---|
| 5,999,173 | A * | 12/1999 | Ubillos | G11B 27/034 |
| 10,622,021 | B2 * | 4/2020 | Buyuklu | G11B 27/34 |
| 11,533,442 | B2 * | 12/2022 | Yuan | H04N 5/262 |
| 11,741,995 | B1 * | 8/2023 | Achddou | H04N 21/8456 715/700 |
| 12,068,006 | B2 * | 8/2024 | He | G11B 27/34 |
| 12,120,450 | B2 * | 10/2024 | Xiao | H04N 5/91 |
| 2008/0267443 | A1 * | 10/2008 | Aarabi | G06V 40/162 382/100 |
| 2011/0276881 | A1 * | 11/2011 | Keng | G11B 27/034 715/723 |
| 2012/0042251 | A1 * | 2/2012 | Rodriguez | G11B 27/034 715/723 |
| 2017/0078566 | A1 * | 3/2017 | Ota | H04N 5/2621 |
| 2017/0243611 | A1 * | 8/2017 | Buyuklu | G11B 27/036 |
| 2021/0058564 | A1 * | 2/2021 | Yuan | H04N 5/262 |
| 2023/0097879 | A1 * | 3/2023 | Long | G06F 3/04845 348/222.1 |

(Continued)

FOREIGN PATENT DOCUMENTS

CN 104427259 A 3/2015

*Primary Examiner* — Pritham D Prabhakher
(74) *Attorney, Agent, or Firm* — Astute IP Law Group

(57) ABSTRACT

Embodiments of the present disclosure provide a special effect processing method, an electronic device, a storage medium, and a program product. The method includes: displaying a special effect preview interface in response to an effect preview triggering operation for a target special effect, where the special effect preview interface at least includes a time setting item, and the time setting item is used to set a preview moment of the target special effect; and in response to a time setting triggering operation based on the time setting item, determining a special effect preview image according to a set preview moment and the target special effect, and displaying the special effect preview image.

14 Claims, 4 Drawing Sheets

(56) References Cited

U.S. PATENT DOCUMENTS

2023/0107220 A1* 4/2023 He ........................ G11B 27/34
386/278
2023/0254436 A1* 8/2023 Xie ........................ G10H 1/368
348/239
2023/0276014 A1* 8/2023 Xiao ........................ H04N 5/91
348/239

* cited by examiner

SPECIAL EFFECT PROCESSING METHOD, ELECTRONIC DEVICE, STORAGE MEDIUM, AND PROGRAM PRODUCT

CROSS-REFERENCE TO RELATED APPLICATION

The present application claims priority of the Chinese Patent Application No. 202410282290.7, filed on Mar. 12, 2024, the disclosure of which is incorporated herein by reference in its entirety as part of the present application.

TECHNICAL FIELD

Embodiments of the present disclosure relate to a special effect processing method, an electronic device, a storage medium, and a program product.

BACKGROUND

During the process of producing or applying special effects, preview of the special effects is usually supported to make it convenient for a user to view or adjust. To preview a special effect, it is usually necessary to use complete special effect elements to process an object that needs special effect processing to obtain a special effect video. The special effect video is then played frame by frame from a start moment of the special effect video until an end moment of the special effect. Once a special effect element in the special effect needs to be viewed for many times, the special effect video needs to be viewed from beginning to end. This manner of special effect preview is not flexible enough, and involves viewing irrelevant information other than the special effect element of concern, which takes a long time, and degrades special effect processing experience.

SUMMARY

The present disclosure provides a special effect processing method and apparatus, an electronic device, a storage medium, and a program product, so that a special effect can be flexibly previewed during production or application of the special effect, and preview duration of the special effect is shortened, thereby improving experience for previewing the special effect.

The embodiment of the present disclosure provides a special effect processing method. The method includes:

- displaying a special effect preview interface in response to an effect preview triggering operation for a target special effect, where the special effect preview interface at least includes a time setting item, the time setting item is used to set a preview moment of the target special effect; and
- in response to a time setting triggering operation based on the time setting item, determining a special effect preview image according to a set preview moment and the target special effect, and displaying the special effect preview image.

The embodiment of the present disclosure further provides a special effect processing apparatus. The apparatus includes a special effect preview triggering module and a special effect preview module.

The special effect preview triggering module is configured to display a special effect preview interface in response to an effect preview triggering operation of a target special effect. The special effect preview interface at least includes a time setting item, and the time setting item is used to set a preview moment of the target special effect.

The special effect preview module is configured to, in response to a time setting triggering operation based on the time setting item, determine a special effect preview image according to a set preview moment and the target special effect and display the special effect preview image.

The embodiment of the present disclosure further provides an electronic device. The electronic device includes one or more processors, and a memory. The memory is configured to store one or more programs. When the one or more programs are executed by the one or more processors, the one or more processors is caused to implement the special effect processing method according to any one of the embodiments of the present disclosure.

The embodiment of the present disclosure further provides a storage medium including computer-executable instructions. When the computer-executable instructions are executed by a computer processor, the computer-executable instructions are used to perform the special effect processing method according to any one of the embodiments of the present disclosure.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION

Figure 1:
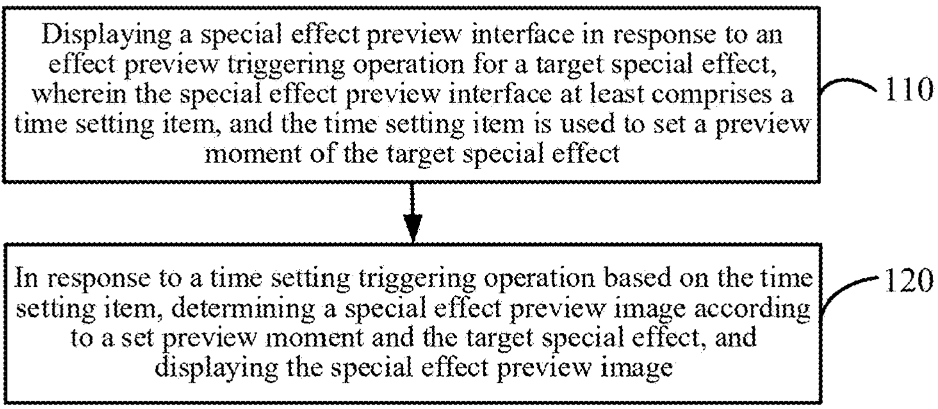
FIG. 1 is a schematic flowchart of a special effect processing method according to an embodiment of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include" used herein and the variations thereof are an open-ended inclusion, namely, "include but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

It can be understood that before the use of the technical solutions disclosed in the embodiments of the present disclosure, the user shall be informed of the type, range of use, use scenarios, etc., of personal information involved in the present disclosure in an appropriate manner in accordance with the relevant laws and regulations, and the authorization of the user shall be obtained.

For example, in response to reception of an active request from the user, prompt information is sent to the user to clearly inform the user that a requested operation will require access to and use of the personal information of the user. As such, the user can independently choose, based on the prompt information, whether to provide the personal information to software or hardware, such as an electronic device, an application, a server, or a storage medium, that performs operations in the technical solutions of the present disclosure.

As an optional but non-limiting implementation, in response to the reception of the active request from the user, the prompt information may be sent to the user in the form of, for example, a pop-up window, in which the prompt information may be presented in text. Furthermore, the pop-up window may further include a selection control for the user to choose whether to "agree" or "disagree" to provide the personal information to the electronic device.

It can be understood that the above process of notifying and obtaining the authorization of the user is only illustrative and does not constitute a limitation on the implementations of the present disclosure, and other manners that satisfy the relevant laws and regulations may also be applied in the implementations of the present disclosure.

It can be understood that the data involved in the technical solutions (including, but not limited to, the data itself and the access to or use of the data) shall comply with the requirements of corresponding laws, regulations, and relevant provisions.

FIG. 1 is a schematic flowchart of a special effect processing method according to an embodiment of the present disclosure. The embodiment of the present disclosure is applicable to previewing a special effect, and the method may be performed by a special effect processing apparatus. The apparatus may be implemented in the form of software and/or hardware. Optionally, the apparatus may be implemented by an electronic device, and the electronic device may be a mobile terminal, a PC, a server, or the like.

As shown in FIG. 1, the method in this embodiment may specifically include the following steps.

S110: displaying a special effect preview interface in response to an effect preview triggering operation for a target special effect, wherein the special effect preview interface at least comprises a time setting item, and the time setting item is used to set a preview moment of the target special effect.

The target special effect may be understood as a special effect that requires effect preview. In an embodiment, the target special effect may be a special effect of a special effect prop. Optionally, the special effect prop may be a special effect prop in an editing state, or may be a special effect prop that has been produced. In another embodiment, the target special effect may be a special effect mounted to a target object, where the target object may be understood as an object to which the target special effect is applied, i.e., an object mounted with the target special effect, such as an image. The effect preview triggering operation may be understood as a triggering operation used for performing effect preview on the target special effect. The special effect preview interface may be understood as an interface used for settings the preview of the target special effect. The special effect preview interface may at least include a time setting item. The time setting item may be used to set a preview moment of the target special effect. It should be noted that the preview moment of the target special effect may be set according to actual needs, which is not specifically limited herein. In this embodiment of the present disclosure, a display style of the time setting item may be a parameter input box used for inputting the preview moment; or may be a parameter selection control used for selecting the preview moment; or may be a progress bar used for setting the preview moment, where the progress bar may be provided with a slider, and the slider may be used to set and/or adjust the preview moment.

In this embodiment of the present disclosure, the effect preview triggering operation for the target special effect may include a plurality of cases. For example, the effect preview triggering operation for the target special effect may be an effect preview triggering operation for a target special effect that has been produced; or may be an effect preview triggering operation for a target special effect in an editing state, i.e., an effect preview triggering operation for the target special effect during the process of editing or producing the target special effect; or may be an effect preview triggering operation for a target special effect for a target object when the target special effect is applied to the target object. In this embodiment of the present disclosure, for the effect preview triggering operation for the target special effect in the editing state, the produced special effect can be previewed in real time during the process of producing the target special effect, making the operation simple and convenient.

In this embodiment of the present disclosure, there are a plurality of cases that the preview moment is set for the target special effect, which is not specifically limited herein.

In an optional implementation, when the target special effect is a special effect of a special effect prop, the target special effect is not applied to an object, i.e., the target special effect is the special effect itself. Then, the preview moment of the target special effect may be a moment in a special effect display time of the target special effect. The special effect display time may be understood as display duration of the target special effect itself, i.e., the duration required from the start of the display of the first special effect element in the target special effect to the end of the display of the last special effect element in the target special effect.

In another optional implementation, when the target special effect is a special effect mounted to a target object, i.e., the target special effect is applied to the target object, special effect materials may be generated based on the target special effect and the target object. Then, the preview moment of the target special effect may be a moment in a material display time of the special effect materials. The material display time may be display duration of the target special effect itself; or may be display duration of the target object.

Figure 2:
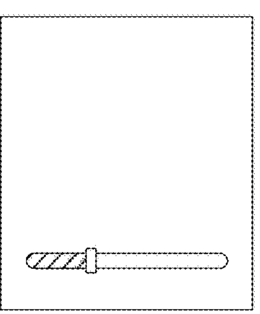
FIG. 2 is a diagram of an interface effect of a special effect preview interface applicable to a special effect processing method according to an embodiment of the present disclosure.
Figures 3A, 3B, 3C:
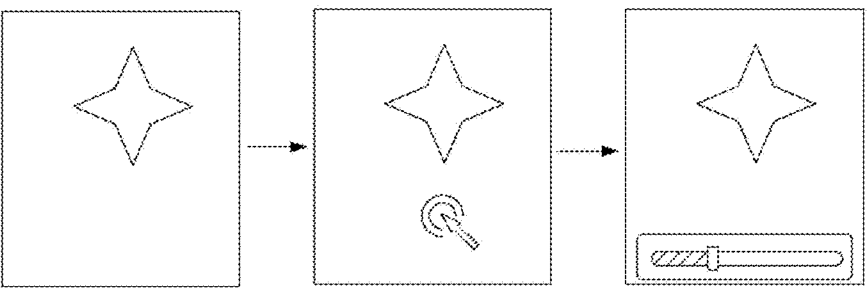
FIG. 3A is a schematic diagram of a display manner of a special effect preview interface applicable to a special effect processing method according to an embodiment of the present disclosure.
FIG. 3B is a schematic diagram of a display manner of a special effect preview interface applicable to a special effect processing method according to an embodiment of the present disclosure.
FIG. 3C is a schematic diagram of a display manner of a special effect preview interface applicable to a special effect processing method according to an embodiment of the present disclosure.
Figure 4:
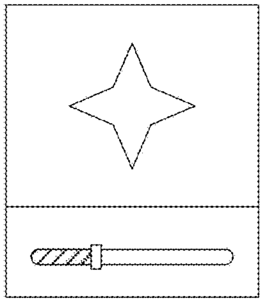
FIG. 4 is a schematic diagram of a display manner of a special effect preview interface applicable to a special effect processing method according to an embodiment of the present disclosure.

In this embodiment of the present disclosure, an interface layout style of the special effect preview interface may be set according to actual needs, and is not specifically limited herein. For example, the special effect preview interface may display a special effect time setting item (referring to FIG. 2). Alternatively, the special effect preview interface may be configured with a hidden special effect time setting item (referring to FIG. 3A), so that the hidden special effect time setting item may be displayed on the special effect preview interface (referring to FIG. 3C) after a triggering operation (e.g., a click operation or a hover operation) for the special effect preview interface (as indicated by the arrow in FIG. 3B) is received. Alternatively, the special effect preview interface may include a special effect preview setting area and a special effect preview area, and the special effect preview setting area displays a special effect time setting item (referring to FIG. 4).

The special effect preview setting area may be understood as an area that is in the special effect preview interface and is used to set the preview of the target special effect. The special effect preview area may be understood as an area that is in the special effect preview interface and is used to preview the effect of the target special effect. It should be noted that a layout manner of the special effect preview setting area and the special effect preview area may be set according to actual needs, which is not specifically limited herein. For example, the layout manner of the special effect preview setting area and the special effect preview area may be up-and-down structural layout or left-and-right structural layout.

S120: in response to a time setting triggering operation based on the time setting item, determining a special effect preview image according to a set preview moment and the target special effect, and displaying the special effect preview image.

The time setting triggering operation may be understood as a triggering operation performed on the time setting item to set the preview moment. In this embodiment of the present disclosure, the special effect preview image may be understood as an image of the target special effect that needs to be displayed at the preview moment. There may be one, two, or more special effect preview images.

Specifically, after a time setting operation for the time setting item is received, a set preview moment may be obtained according to the time setting operation. After the set preview moment is obtained, a special effect preview image may be determined according to the set preview moment and the target special effect. After the special effect preview image is determined, the special effect preview image may be displayed.

In this embodiment of the present disclosure, there are a plurality of manners of obtaining the set preview moment according to the time setting operation, which is not specifically limited herein.

As an optional implementation of this embodiment of the present disclosure, when the display style of the time setting item is a parameter input box used for inputting a preview moment, obtaining the set preview moment may specifically be that, in response to a time parameter input operation for the parameter input box, a time parameter entered according to the parameter input box may be obtained, i.e., the preview moment is obtained. The time parameter input operation may be understood as an operation of entering the preview moment in the parameter input box. The benefit of such an operation is that the preview moment of the target special effect can be accurately set.

As another optional implementation of this embodiment of the present disclosure, when the display style of the time setting item is a progress bar used for setting a preview moment, obtaining the set preview moment may specifically be that, a slider position may be obtained in response to a slider control operation for a slider on the progress bar. Further, a time point corresponding to the slider position may be determined according to a correspondence between the slider position and a time point on the progress bar. Then, the time point corresponding to the slider position may be used as the preview moment of the target special effect. The slider control operation may be understood as an operation performed on the slider on the progress bar to set or adjust the preview moment. Optionally, the slider control operation may include a slider dragging operation and/or a slider position setting operation. The benefit of such an operation is that interactive experience for setting the preview moment can be enhanced.

As still another optional implementation of this embodiment of the present disclosure, when the display style of the time setting item is a parameter selection control used for selecting a preview moment, obtaining the set preview moment may specifically be that a time selection window bound to the parameter selection control may be displayed in response to a control triggering operation for the parameter selection control, where the time selection window displays at least one preview moment to be selected corresponding to the target special effect. After a time selection operation for the preview moment to be selected is received, a selected preview moment, i.e., the preview moment of the target special effect, may be determined. The benefit of such an operation is that optional preview moments are provided in the form of a visual interface to set the preview moment of the target special effect, thereby improving the convenience for setting the preview moment.

In this embodiment of the present disclosure, there are a plurality of manners of displaying the special effect preview image, which is not specifically limited herein. As an optional implementation of this embodiment of the present disclosure, the displaying the special effect preview image may include: determining whether there is an effect preview interface used for displaying the special effect preview image, where the effect preview interface may be an interface independent of the special effect preview interface. When there is an effect preview interface used for displaying the special effect preview image, the special effect preview image may be displayed on the effect preview interface. Specifically, a jump may be made from the special effect preview interface to the effect preview interface, and the special effect preview image is displayed on the effect preview interface. It can be understood that, when there is no effect preview interface used for displaying the special effect preview image, an effect preview interface may be created, and the special effect preview image may be displayed on the effect preview interface. According to the technical solution, displaying the special effect preview image on the effect preview interface may specifically be: according to a size of the effect preview interface, adaptively displaying the special effect preview image on the effect preview interface, to improve a visual effect of previewing the special effect.

As another optional implementation of this embodiment of the present disclosure, the displaying the special effect preview image may include: when the special effect preview interface displays an initial special effect image of the target special effect, and the special effect preview interface is configured with a hidden special effect time setting item, displaying the special effect time setting item on the special effect preview interface after a triggering operation for the special effect preview interface is received; and after a time setting triggering operation for the special effect time setting item is received, obtaining a special effect preview image corresponding to the time setting triggering operation, and updating the initial special effect image in the special effect preview interface to the special effect preview image. The benefit of such setting is that a special effect preview interaction effect can be improved.

As still another optional implementation of this embodiment of the present disclosure, the special effect preview interface may include a special effect preview setting area and a special effect preview area, the special effect preview setting area displays a special effect time setting item; and the displaying the special effect preview image may include: after a time setting triggering operation for the special effect time setting item is received, determining a special effect preview image corresponding to the time setting triggering operation, and displaying the special effect preview image in the special effect preview area. The benefit of such setting is that both the setting of the preview moment of the target special effect and the previewing of the target special effect may be performed on the same interface, making the operation simple and convenient.

It should be noted that after an effect preview triggering operation for the target special effect is received, operation information of the effect preview triggering operation can be acquired, thereby obtaining an operation event corresponding to the effect preview triggering operation according to the operation information. A computer programming language for the operation event may be an object-oriented programming language, such as C++, C #, or Java. After the operation event corresponding to the effect preview triggering operation is determined, a response may be made to the operation event, for example, the operation event may be parsed by invoking a preset JavaScript script. In this case, a parsing result can be obtained, i.e., a preview moment is set for the target special effect. Thus, the preview moment is transferred as an actual parameter to a formal parameter of a method for previewing the target special effect, to flexibly preview the target special effect.

In order to facilitate adjustment of the special effect of the target special effect, after displaying the special effect preview image, the technical solutions provided in this embodiment of the present disclosure may further include: determining a special effect element corresponding to the special effect preview image, and displaying a display attribute setting item corresponding to the special effect element, where the display attribute setting item may be used to set a display state attribute of the special effect element, and the display state attribute may be set to hidden or displayed. After an attribute setting operation for the display attribute setting item is received, a display state attribute that is set for the special effect element is obtained. Thus, a display effect of the special effect element in the target special effect can be adjusted based on the display state attribute. For example, a special effect element that is displayed in the target special effect may not be displayed; or a special effect element that is not displayed in the target special effect may be displayed.

According to the technical solutions provided in the embodiments of the present disclosure, firstly, a special effect preview interface is displayed in response to an effect preview triggering operation of a target special effect, where the special effect preview interface at least includes a time setting item, and the time setting item is used to set a preview moment of the target special effect. An interaction function is added to the special effect preview interface to support setting and adjustment of the special effect preview moment, i.e., support fixed-point preview of the special effect, which can satisfy personalized needs for preview of the special effect, and make the preview of the special effect controllable. Then, in response to a time setting triggering operation according to the time setting item, setting the preview moment for the special effect is caused to be more flexible. After a set preview moment is obtained, a special effect preview image is determined according to the set preview moment and the target special effect, and the special effect preview image is displayed, thereby resolving the technical problems that preview of a special effect is not flexible enough and takes a long time, and achieving the beneficial effects that a special effect can be flexibly previewed during production or application of the special effect, and preview duration of the special effect is shortened.

Figure 5:
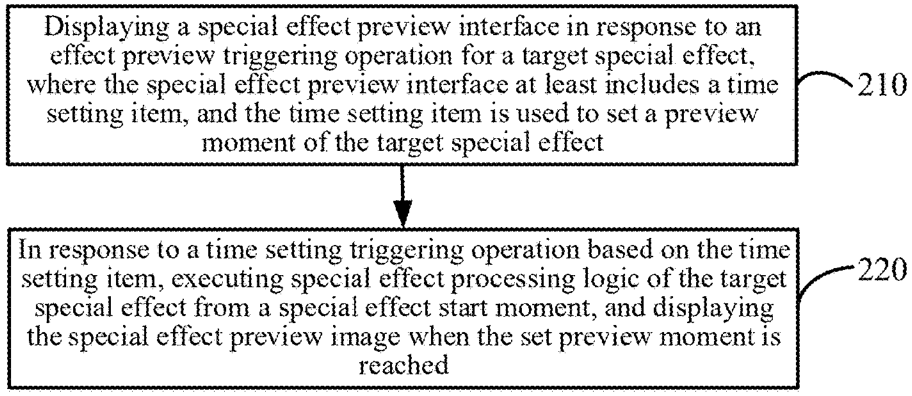
FIG. 5 is a schematic flowchart of another special effect processing method according to an embodiment of the present disclosure.

FIG. 5 is a schematic flowchart of another special effect processing method according to an embodiment of the present disclosure. According to the technical solution provided in this embodiment, on the basis of the above embodiments, the determining a special effect preview image according to a set preview moment and the target special effect is further described in more detail. Optionally, the determining a special effect preview image according to a set preview moment and the target special effect, includes: executing special effect processing logic of the target special effect from a special effect start moment, and displaying the special effect preview image when the set preview moment is reached. For a specific implementation, reference may be made to the description of this embodiment. Details about technical features that are the same as or similar to those in the foregoing embodiment are not repeated herein.

As shown in FIG. 5, the method in this embodiment may specifically include the following steps.

S210: displaying a special effect preview interface in response to an effect preview triggering operation for a target special effect, where the special effect preview interface at least includes a time setting item, and the time setting item is used to set a preview moment of the target special effect.

S220: in response to a time setting triggering operation based on the time setting item, executing special effect processing logic of the target special effect from a special effect start moment, and displaying the special effect preview image when the set preview moment is reached.

The special effect start moment may be understood as a moment at which a related operation for performing the special effect preview image starts to be generated. For example, a preset moment (e.g., a preset zero moment) or a display start time of the first special effect element may be used as the special effect start moment. When there is a special effect processing image to which the target special effect is applied, a moment at which the special effect processing image starts to be displayed may be used as the special effect start moment. As an optional implementation of this embodiment of the present disclosure, a manner of determining the special effect start moment may be as follows: displaying a timeline on the special effect preview interface, where a default initial moment of the timeline may be moment 0. Then, the special effect start moment may be moment 0.

The special effect processing logic may be understood as a special effect processing operation to be performed for enabling each special effect element in the target special effect to present a target display effect. The special effect processing logic of the target special effect is related to the special effect element included in the target special effect, and a manner of presenting the special effect element.

Specifically, after the time setting triggering operation based on the time setting item is received, the special effect start moment of the target special effect, the special effect processing logic of the target special effect and the set preview moment may be obtained. Thus, the special effect processing logic of the target special effect from the special effect start moment to the set preview moment may be executed. When the set preview moment is reached, a special effect preview image at the preview moment may be obtained. After the special effect preview image is obtained, the special effect preview image may be displayed.

In this embodiment of the present disclosure, before the executing special effect processing logic of the target special effect from a special effect start moment, the method may further include: resetting the target special effect by invoking a predefined special effect reset method. The benefit of such processing is as follows: each time the target special effect is previewed, the special effect processing logic can be executed from the special effect start moment of the target special effect, and the special effect processing logic from the special effect start moment to the preview moment can be simulated, thereby effectively preventing the previewing of the special effect from being abnormal and preventing experience effect for previewing the special effect from being affected, and accurately presenting the special effect preview image at the preview moment.

In this embodiment of the present disclosure, the target special effect may include at least one special effect element. In other words, the target special effect may include one or more special effect elements. The special effect element may be a minimum unit that forms the target special effect, and the minimum unit may be set manually as needed, which is not specifically limited herein. Taking a target special effect of fire as an example, the special effect may include one special effect element of flame, or a plurality of special effect elements of flame.

The executing special effect processing logic of the target special effect from a special effect start moment may include: determining the special effect start moment, a display start moment of each special effect element, a display end moment of each special effect element and the preview moment as segmentation points, and using a time length between every two adjacent segmentation points as a time increment; and invoking, starting from the special effect start moment, a predefined display control method at each interval of the time increment to control a special effect element corresponding to the time increment to present a target display effect. It can be understood that there may be one or more time increments from the special effect start moment to the preview moment. Since the time increment is related to the display start moment of the special effect element, the display end moment of the special effect element and the preview moment, when one or more of the display start moment of the special effect element, the display end moment of the special effect element and the preview moment change, one or more time increments change accordingly. For example, in the case of performing operations of adding or deleting a special effect element, modifying a display start moment and/or display end moment of an element and changing a preview moment, one or more time increments may also change.

In the art of this embodiment of the present disclosure, at the display start moment and display end moment of each special effect element, the displaying and hiding of the special effect element are controlled by invoking a predefined display control method. The benefit of determining the special effect start moment, the display start moment of each special effect element, the display end moment of each special effect element and the preview moment as segmentation points is that a key moment associated with a display effect of each special effect element can be accurately identified, thereby ensuring accurate control of the display effect of the special effect element. Further, a time length between every two adjacent segmentation points is used as a time increment, and time is divided at a fine granularity by using the time length between every two adjacent segmentation points as the time increment, so that each special effect element can be completely rendered. The technical solution is particularly applicable to the case that a plurality of special effect elements are displayed in an overlapping manner in a period of time in the target special effect, and can effectively avoid display confusion caused by display time overlapping of the special effect elements. Furthermore, total duration during which a special effect needs to be simulated may be determined by superimposing time increments, so that it is convenient to calculate whether the set preview moment is reached.

Figure 6:
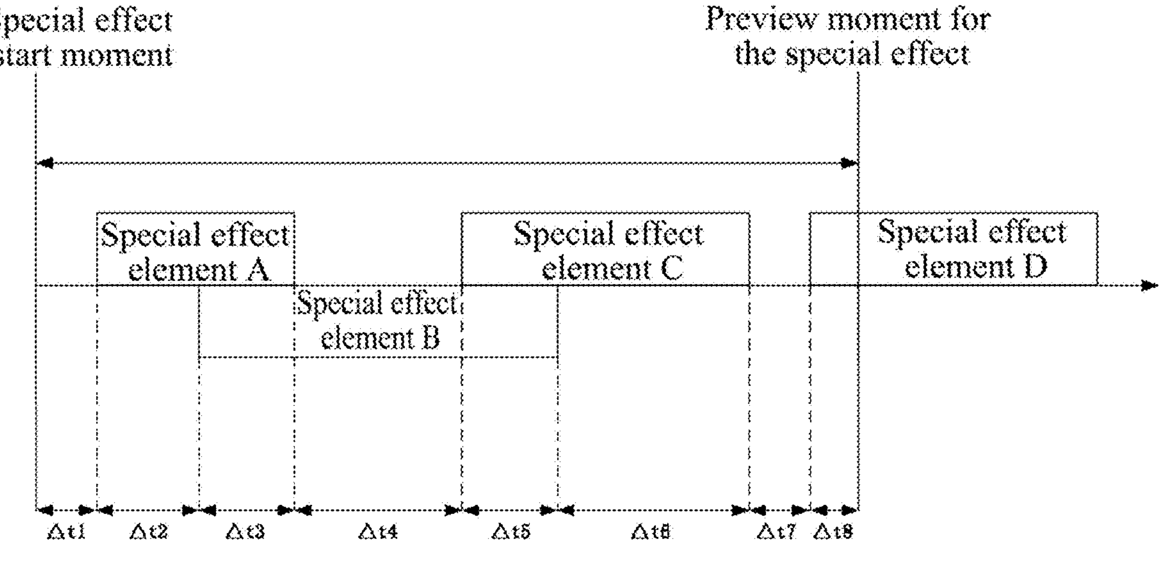
FIG. 6 is an example diagram of a time increment division manner applicable to a special effect processing method according to an embodiment of the present disclosure.

As shown in FIG. 6, when the target special effect may include a special effect element A, a special effect element B, a special effect element C and a special effect element D, the first time increment, i.e., $\Delta t1$, may be determined according to the special effect start moment of the target special effect and a display start moment of the special effect element A; the second time increment, i.e., Δt2, may be determined according to the display start moment of the special effect element A and a display start moment of the special effect element B; the third time increment, i.e., Δt3, may be determined according to the display start moment of the special effect element B and a display end moment of the special effect element A; the fourth time increment, i.e., Δt4, may be determined according to the display end moment of the special effect element A and a display start moment of the special effect element C; the fifth time increment, i.e., Δt5, may be determined according to the display start moment of the special effect element C and a display end moment of the special effect element B; the sixth time increment, i.e., Δt6, may be determined according to the display end moment of the special effect element B and a display end moment of the special effect element C; the seventh time increment, i.e., Δt7, may be determined according to the display end moment of the special effect element C and a display start moment of the special effect element D; and the eighth time increment, i.e., Δt8, may be determined according to the display start moment of the special effect element D and the preview moment of the target special effect.

In this embodiment of the present disclosure, the display start moment may be understood as a moment at which a special effect element starts to be displayed. The display end moment may be understood as a moment at which a special effect element ends being displayed. The display start moment of each special effect element and the display end moment of each special effect element may be the same or different. The display control method may be understood as a predefined method used for controlling the special effect element corresponding to the time increment to present a target display effect. Input parameters of the display control method may include the time increment.

According to the technical solution provided in this embodiment, starting from the special effect start moment, the predefined display control method is invoked at each interval of the time increment. The benefit of such processing is that the invocation timing of the predefined display control method can be quickly and conveniently determined, so that the predefined display control method is invoked according to the time increment to accurately control the special effect element to present the target display effect.

In this embodiment of the present disclosure, before the determining the special effect start moment, a display start moment of each special effect element, a display end moment of each special effect element and the preview moment as segmentation points, the special effect processing method may further include: determining the display start moment of each special effect element and the display end moment of each special effect element according to a preset target field corresponding to each special effect element. The target field may be understood as a preset field used for indicating the display start moment and/or display end moment of the special effect element. The benefit of such setting is that the display start moment and display end moment of each special effect element can be simply, quickly, and accurately determined according to the target field corresponding to the special effect element.

Specifically, a corresponding target field is preset for each special effect element in the target special effect. Thus, the corresponding target field may be set according to each special effect element, and the target field corresponding to the special effect element can be determined. According to the technical solution, the display start moment and/or display end moment of each special effect element in the target special effect can be effectively and quickly determined by presetting the corresponding target field for each special effect element in the target special effect.

In this embodiment of the present disclosure, a field for a display start moment and a field for a display end moment may be identified with the same field, or may be identified with different fields. When the field for the display start moment and the field for the display end moment are identified with the same field, the display start moment and display end moment of the special effect element may be determined according to a time sequence. It should be further noted that in the embodiments of the present disclosure, the same special effect element may be identified with the same field, or may be identified with different fields, which is not specifically limited herein. To obtain display start moments and display end moments of all special effect elements conveniently, the same field may be used for identification to make it convenient for unified identification of fields. Furthermore, a specific field identifier may be set for a field for a special effect element, so as to quickly obtain a display start moment and display end moment of the special effect element.

In this embodiment of the present disclosure, after the display start moment and display end moment of each special effect element are determined, the display start moment and display end moment of each special effect element may be stored in a target array to enable subsequent quick reading of the display start moment and display end moment of the special effect element. The target array may be understood as an array used for storing the display start moment and display end moment of each special effect element.

It should be noted that in the embodiments of the present disclosure, the number of target arrays may be one, two, or more. For example, an array may be created for uniformly storing the display start moments and the display end moments of all special effect elements. Alternatively, two arrays may be created, i.e., a first array and a second array. The first array may be used to store the display start moment of each special effect element, and the second array may be used to store the display end moment of each special effect element. Furthermore, one array may be set for each type of special effect element, so that the array is used to store the display start moment and display end moment of the special effect element corresponding to the array.

On the basis of the above embodiments, the displaying the special effect preview image when the set preview moment is reached, may include: determining target special effect simulation duration of the target special effect according to the preview moment, and determining actual special effect simulation duration of the target special effect according to the time increment; and displaying the special effect preview image corresponding to the target special effect when the actual special effect simulation duration reaches the target special effect simulation duration.

The target special effect simulation duration may be understood as the target duration during which the target special effect needs to be simulated. In this embodiment of the present disclosure, determining target special effect simulation duration of the target special effect according to the preview moment may specifically be: determining a time length between the special effect start moment of the target special effect and the preview moment, and using the time length between the special effect start moment of the target special effect and the preview moment as the target special effect simulation duration of the target special effect. The actual special effect simulation duration may be special effect simulation duration calculated according to the time increment. In this embodiment of the present disclosure, determining the actual special effect simulation duration of the target special effect according to the time increment may specifically be that a plurality of time increments are superimposed to obtain the actual special effect simulation duration. The reason for such processing is that it can not only completely simulate the effects of the target special effect, but also determine, by simply accumulating the time increments, whether the actual special effect simulation duration reaches the target special effect simulation duration.

Optionally, the special effect element may include a first element and a second element, the second element is displayed in association with the first element. In the embodiments of the present disclosure, there may be a plurality of cases that the second element is displayed in association with the first element, which is not specifically limited herein. For example, a display start moment of the first element and a display start moment of the second element may be the same, and a display end moment of the first element and a display end moment of the second element may be the same; or a display start moment of the first element may be earlier than a display start moment of the second element, and a display end moment of the first element and a display end moment of the second element may be the same; or a display start moment of the first element may be earlier than a display start moment of the second element, and a display end moment of the first element may be earlier than a display end moment of the second element; or a display start moment of the first element may be earlier than a display start moment of the second element, and a display end moment of the first element may be later than a display end moment of the second element.

When the special effect element includes a first element and a second element, and the second element is displayed in association with the first element, the display control method may include a first control method and a second control method. In the embodiments of the present disclosure, the first control method may be understood as a predefined method used for controlling the first element to be displayed as a first display effect. The first display effect may be understood as an effect that needs to be presented for the first element. The second control method may be understood as a predefined method used for controlling the second element to be displayed as a second display effect. The second display effect may be understood as an effect that needs to be presented for the second element.

On the basis of the above embodiments, the invoking a predefined display control method to control a special effect element corresponding to the time increment to present a target display effect, may include: invoking the first control method to control a first display effect of the first element, and invoking the second control method to control a second display effect of the second element, to obtain the target display effect. An execution timing of the first control method and the second control method is determined according to an association display manner of the second element and the first element. The target display effect may be a display effect obtained based on the first display effect of the first element and the second display effect of the second element.

Specifically, a display start moment and display end moment of the first element are determined, and a display start moment and display end moment of the second element are determined. Thus, the first display duration of the first element can be obtained according to the display start moment and display end moment of the first element; and the second display duration of the second element may be obtained according to the display start moment and display end moment of the second element. After the first display duration and the second display duration are obtained, the first display duration and the second display duration, as actual parameters, may be respectively transferred to a formal parameter of the first control method and a formal parameter of the second control method. After the parameters are transferred, the first display effect of the first element may be controlled based on the first control method, and the second display effect of the second element may be controlled based on the second control method. Therefore, the target display effect can be obtained according to the first display effect and the second display effect.

According to the technical solutions provided in the embodiments of the present disclosure, the preview moment can be intuitively set by responding to the time setting triggering operation that is based on the time setting item. After the preview moment is set, the special effect processing logic of the target special effect is executed from a special effect start moment, and the special effect preview image is displayed when the set preview moment is reached, thereby implementing a function of personalized preview of the target special effect.

Figure 7:
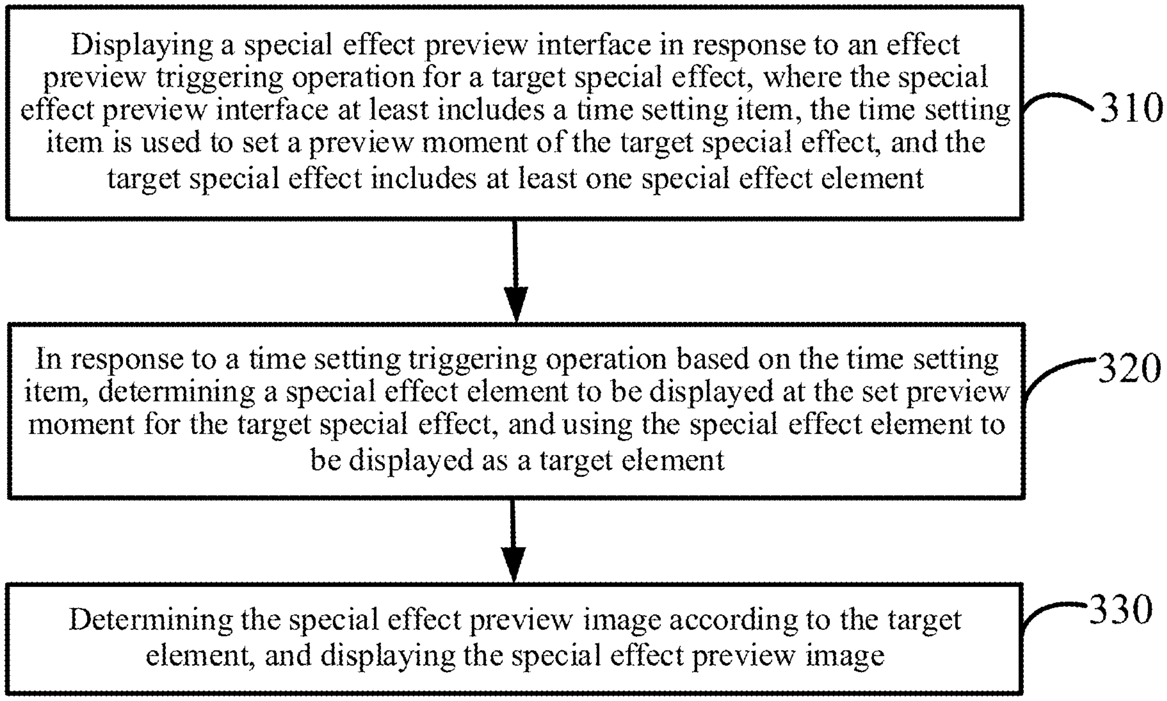
FIG. 7 is a schematic flowchart of still another special effect processing method according to an embodiment of the present disclosure.

FIG. 7 is a schematic flowchart of another special effect processing method according to an embodiment of the present disclosure. According to the technical solution provided in this embodiment, on the basis of the above embodiments, the determining a special effect preview image according to a set preview moment and the target special effect is further described in more detail. Optionally, the target special effect includes at least one special effect element; and the determining a special effect preview image according to a set preview moment and the target special effect, includes: determining a special effect element to be displayed at the set preview moment for the target special effect, using the special effect element to be displayed as a target element, and determining the special effect preview image according to the target element. For a specific implementation, reference may be made to the description of this embodiment. Details about technical features that are the same as or similar to those in the foregoing embodiment are not repeated herein.

As shown in FIG. 7, the method in this embodiment may specifically include the following steps.

S310: displaying a special effect preview interface in response to an effect preview triggering operation for a target special effect, where the special effect preview interface at least includes a time setting item, the time setting item is used to set a preview moment of the target special effect, and the target special effect includes at least one special effect element.

S320: in response to a time setting triggering operation based on the time setting item, determining a special effect element to be displayed at the set preview moment for the target special effect, and using the special effect element to be displayed as a target element.

The target element may be understood as a special effect element that needs to be displayed of the target special effect at the set preview moment. The number of the target elements may be one, two, or more.

Optionally, after the time setting triggering operation based on the time setting item is received, a preview moment set for the target special effect may be obtained. After the set preview moment is obtained, a special effect configuration file of the target special effect may be acquired, and the special effect configuration file may be parsed to obtain special effect display information of each special effect element in the target special effect. The special effect configuration file may be understood as a file used for configuring special effect information of the special effect element in the target special effect. It should be noted that there may be a plurality of file formats for the special effect configuration file, for example, an XML format or a JSON format, which is not specifically limited herein. The special effect display information at least includes a display start moment and a display end moment of each special effect element. Further, the special effect element to be displayed at the set preview moment for the target special effect may be determined according to the special effect display information of each special effect element. After the special effect element to be displayed is determined, the special effect element to be displayed may be used as a target element.

S330: determining the special effect preview image according to the target element, and displaying the special effect preview image.

In the embodiments of the present disclosure, a special effect preview image may be obtained by performing targeted processing on the target element that is directly related to the special effect at the preview moment. Specifically, for each target element, an element control method corresponding to the target element may be invoked by using a display start moment of the target element as an actual parameter, and the target element is controlled to be displayed in a target effect, to obtain the special effect preview image.

In the embodiments of the present invention, the target effect may be understood as a display effect of the target element in the target special effect. Specifically, for each target element, a display start moment of the target element and an element control method corresponding to the target element are determined. Thus, the display start moment can be transferred as an actual parameter to a formal parameter of the element control method. After the parameter is transferred, the element control method may be performed to control the target element to be displayed in a target effect. In this case, an image obtained by displaying the target effect is a special effect preview image, i.e., a special effect preview image is obtained.

After the target element is determined, a special effect preview image is determined according to the target element. After the special effect preview image is determined, the special effect preview image may be displayed.

According to the technical solutions provided in the embodiments of the present disclosure, in response to a time setting triggering operation based on the time setting item, a special effect element to be displayed at the set preview moment is determined for the target special effect, the special effect element to be displayed is used as a target element, and a special effect preview image is determined according to the target element, so that accurate positioning of the special effect element associated with the preview moment in the target special effect is implemented, and positioning efficiency of the special effect element is improved, thereby satisfying personalized needs for preview of special effects.

Figure 8:
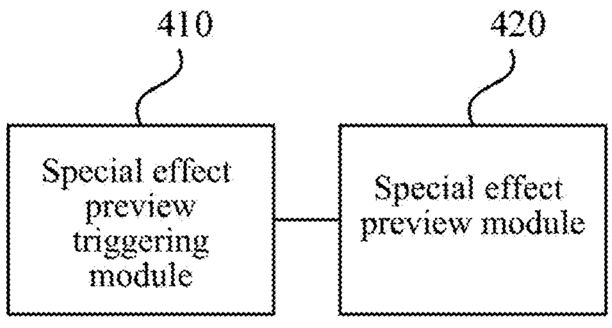
FIG. 8 is a structural schematic diagram of a special effect processing apparatus according to an embodiment of the present disclosure.

FIG. 8 is a structural schematic diagram of a special effect processing apparatus according to an embodiment of the present disclosure. As shown in FIG. 8, the apparatus includes: a special effect preview triggering module 410 and a special effect preview module 420.

The special effect preview triggering module 410 is configured to display a special effect preview interface in response to an effect preview triggering operation for a target special effect, where the special effect preview interface at least includes a time setting item, and the time setting item is used to set a preview moment of the target special effect. The special effect preview module 420 is configured to determine a special effect preview image according to a set preview moment and the target special effect, and display the special effect preview image, in response to a time setting triggering operation according to the time setting item.

According to the technical solutions provided in the embodiments of the present disclosure, firstly, the special effect preview triggering module 410 displays a special effect preview interface in response to an effect preview triggering operation for a target special effect, where the special effect preview interface at least includes a time setting item, and the time setting item is used to set a preview moment of the target special effect. An interaction function is added to the special effect preview interface to support setting and adjustment of the special effect preview moment, i.e., support fixed-point preview of the special effect, which can satisfy personalized needs for preview of the special effect, and make the preview of the special effect controllable. Then, the special effect preview module 420 makes setting of the preview moment for the special effect more flexible in response to a time setting triggering operation based on the time setting item. After a set preview moment is obtained, a special effect preview image is determined according to the set preview moment and the target special effect, and the special effect preview image is displayed, thereby resolving the technical problems that preview of a special effect is not flexible enough and takes a long time in the related art, and achieving the beneficial effects that a special effect can be flexibly previewed during production or application of the special effect, and preview duration of the special effect is shortened.

On the basis of the above optional technical solutions, optionally, the special effect preview module 420 is configured to execute special effect processing logic of the target special effect from a special effect start moment, and display the special effect preview image when the set preview moment is reached.

On the basis of the above optional technical solutions, optionally, the target special effect includes at least one special effect element. The special effect preview module 420 is configured to determine the special effect start moment, a display start moment of each special effect element, a display end moment of each special effect element and the preview moment as segmentation points, and use a time length between every two adjacent segmentation points as a time increment; and invoke, starting from the special effect start moment, a predefined display control method at each interval of the time increment to control a special effect element corresponding to the time increment to present a target display effect.

On the basis of the above optional technical solutions, optionally, the special effect preview module 420 is specifically configured to determine target special effect simulation duration of the target special effect according to the preview moment, and determine actual special effect simulation duration of the target special effect according to the time increment; and display the special effect preview image corresponding to the target special effect when the actual special effect simulation duration reaches the target special effect simulation duration.

On the basis of the above optional technical solutions, optionally, the apparatus further includes a time increment determining module; where the time increment determining module is configured to determine the display start moment of each special effect element and the display end moment of each special effect element respectively according to a preset target field corresponding to the special effect element before the determining the special effect start moment, a display start moment of each special effect element, a display end moment of each special effect element and the preview moment as segmentation points.

On the basis of the above optional technical solutions, optionally, the at least one special effect element includes a first element and a second element, and the second element is displayed in association with the first element. The predefined display control method includes a first control method and a second control method. A special effect display time determining unit is specifically configured to invoke the first control method to control a first display effect of the first element, and invoke the second control method to control a second display effect of the second element, to obtain the target display effect, where an execution timing of the first control method and the second control method is determined according to an association display manner of the second element and the first element.

On the basis of the above optional technical solutions, optionally, the target special effect includes at least one special effect element. The special effect preview module 420 is configured to determine a special effect element to be displayed at the set preview moment for the target special effect, use the special effect element to be displayed as a target element, and determine the special effect preview image according to the target element.

On the basis of the above optional technical solutions, optionally, the special effect preview module 420 is configured to: invoke, for each target element, an element control method corresponding to the target element by using a display start moment of the target element as an actual parameter, and control the target element to be displayed in a target effect to obtain the special effect preview image.

The special effect processing apparatus according to an embodiment of the present disclosure can perform the special effect processing method according to any one of the embodiments of the present disclosure, and has corresponding functional modules and beneficial effects for performing the method.

It is worth noting that the units and modules included in the above apparatus are obtained through division merely according to functional logic, but are not limited to the above division, as long as corresponding functions can be implemented. In addition, specific names of the functional units are merely used for mutual distinguishing, and are not used to limit the protection scope of the embodiments of the present disclosure.

Figure 9:
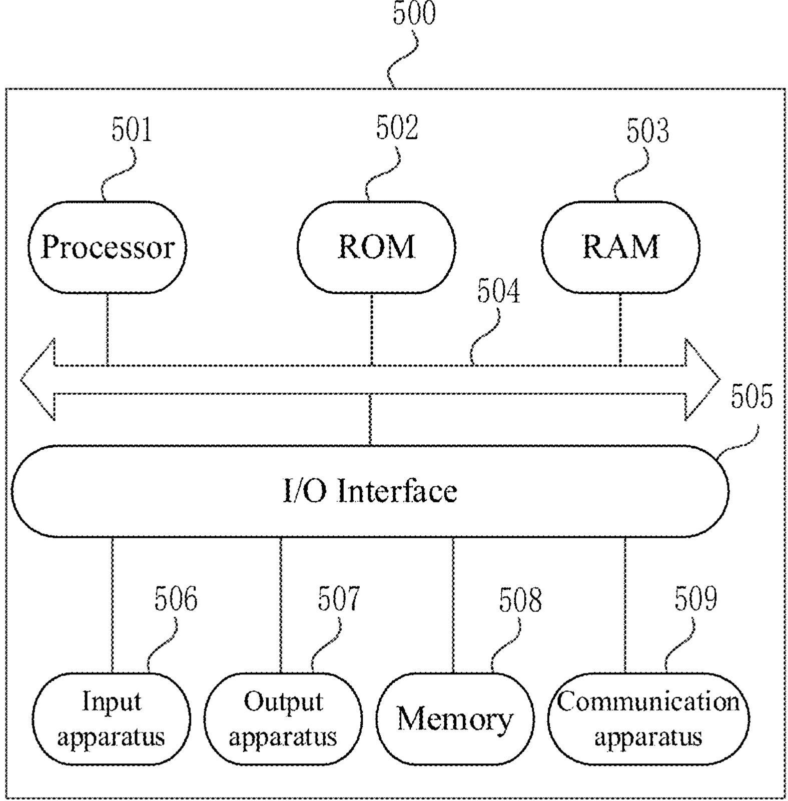
FIG. 9 is a structural schematic diagram of an electronic device according to an embodiment of the present disclosure.

FIG. 9 is a structural schematic diagram of an electronic device according to an embodiment of the present disclosure. Reference is made to FIG. 9 below, which is a structural schematic diagram of an electronic device (such as a terminal device or a server in FIG. 9) 500 suitable for implementing embodiments of the present disclosure. The terminal device in this embodiment of the present disclosure may include, but is not limited to, mobile terminals such as a mobile phone, a notebook computer, a digital broadcast receiver, a personal digital assistant (PDA), a PAD (tablet computer), a portable multimedia player (PMP), and a vehicle-mounted terminal (such as a vehicle navigation terminal), and fixed terminals such as a digital TV and a desktop computer. The electronic device shown in FIG. 9 is merely an example, and shall not impose any limitation on the function and scope of use of the embodiments of the present disclosure.

As shown in FIG. 9, the electronic device 500 may include a processor (e.g., a central processing unit or a graphics processing unit) 501 that may perform a variety of appropriate actions and processing in accordance with a program stored in a read-only memory (ROM) 502 or a program loaded from a memory 508 into a random access memory (RAM) 503. The RAM 503 further stores various programs and data required for the operation of the electronic device 500. The processor 501, the ROM 502, and the RAM 503 are connected to each other through a bus 504. An input/output (I/O) interface 505 is also connected to the bus 504.

Generally, the following apparatuses may be connected to the I/O interface 505: an input apparatus 506 including, for example, a touchscreen, a touchpad, a keyboard, a mouse, a camera, a microphone, an accelerometer, and a gyroscope; an output apparatus 507 including, for example, a liquid crystal display (LCD), a speaker, and a vibrator; the memory 508 including, for example, a tape and a hard disk; and a communication apparatus 509. The communication apparatus 509 may allow the electronic device 500 to perform wireless or wired communication with other devices to exchange data. Although FIG. 9 shows the electronic device 500 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 509 and installed, installed from the memory 508, or installed from the ROM 502. When the computer program is executed by the processor 501, the above-mentioned functions defined in the method of the embodiment of the present disclosure are performed.

The names of messages or information exchanged between a plurality of apparatuses in the implementations of the present disclosure are used for illustrative purposes only, and are not used to limit the scope of these messages or information.

The electronic device according to an embodiment of the present disclosure and the special effect processing method according to the above embodiments belong to the same inventive concept. For the technical details not exhaustively described in this embodiment, reference may be made to the above embodiments, and this embodiment and the above embodiments have the same beneficial effects.

An embodiment of the present disclosure provides a computer storage medium storing a computer program thereon, where the program, when executed by a processor, implements the special effect processing method according to the above embodiments.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) (or a flash memory), an optical fiber, a portable compact disc read-only memory (CD-ROM), an optical storage device, a magnetic storage device, or any suitable combination thereof. In the embodiments of the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as the Hypertext Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: display a special effect preview interface in response to an effect preview triggering operation for a target special effect, where the special effect preview interface at least includes a time setting item, and the time setting item is used to set a preview moment of the target special effect; and determine a special effect preview image according to a set preview moment and the target special effect, and display the special effect preview image, in response to a time setting triggering operation according to the time setting item.

Computer program code for performing operations of the present disclosure can be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. Names of the units do not constitute a limitation on the units themselves in some cases, for example, a first obtaining unit may alternatively be described as "a unit for obtaining at least two Internet Protocol addresses".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) (or a flash memory), an optic fiber, a portable compact disc read-only memory (CD-ROM), an optical storage device, a magnetic storage device, or any suitable combination thereof.

According to one or more embodiments of the present disclosure, Example 1 provides a special effect processing method, including: displaying a special effect preview interface in response to an effect preview triggering operation for a target special effect, where the special effect preview interface at least includes a time setting item, and the time setting item is used to set a preview moment of the target special effect; and in response to a time setting triggering operation based on the time setting item, determining a special effect preview image according to a set preview moment and the target special effect, and displaying the special effect preview image.

According to one or more embodiments of the present disclosure, Example 2 provides the method of Example 1, further including the following steps. Optionally, the determining a special effect preview image according to a set preview moment and the target special effect, and displaying the special effect preview image includes: executing special effect processing logic of the target special effect from a special effect start moment, and displaying the special effect preview image when the set preview moment is reached.

According to one or more embodiments of the present disclosure, Example 3 provides the method of Example 1, further including the following steps. Optionally, the target special effect includes at least one special effect element; and the executing special effect processing logic of the target special effect from a special effect start moment includes: determining the special effect start moment, a display start moment of each special effect element, a display end moment of each special effect element and the preview moment as segmentation points, and using a time length between every two adjacent segmentation points as a time increment; and invoking, starting from the special effect start moment, a predefined display control method at each interval of the time increment to control a special effect element corresponding to the time increment to present a target display effect.

According to one or more embodiments of the present disclosure, Example 4 provides the method of Example 1, further including the following steps. Optionally, the displaying the special effect preview image when the set preview moment is reached includes: determining target special effect simulation duration of the target special effect according to the preview moment, and determining actual special effect simulation duration of the target special effect according to the time increment; and displaying the special effect preview image corresponding to the target special effect when the actual special effect simulation duration reaches the target special effect simulation duration.

According to one or more embodiments of the present disclosure, Example 5 provides the method of Example 1, further including the following steps. Optionally, before the determining the special effect start moment, a display start moment of each special effect element, a display end moment of each special effect element and the preview moment as segmentation points, the special effect processing method further includes: determining the display start moment of each special effect element and the display end moment of each special effect element according to a preset target field corresponding to each special effect element.

According to one or more embodiments of the present disclosure, Example 6 provides the method of Example 1, further including the following steps. Optionally, the at least one special effect element includes a first element and a second element, and the second element is displayed in association with the first element. The predefined display control method includes a first control method and a second control method. The invoking a predefined display control method to control a special effect element corresponding to the time increment to present a target display effect, includes: invoking the first control method to control a first display effect of the first element, and invoking the second control method to control a second display effect of the second element, to obtain the target display effect, where an execution timing of the first control method and the second control method is determined according to an association display manner of the second element and the first element.

According to one or more embodiments of the present disclosure, Example 7 provides the method of Example 1, further including the following steps. Optionally, the target special effect includes at least one special effect element; and the determining a special effect preview image according to a set preview moment and the target special effect includes: determining a special effect element to be displayed at the set preview moment for the target special effect, using the special effect element to be displayed as a target element, and determining the special effect preview image according to the target element.

According to one or more embodiments of the present disclosure, Example 8 provides the method of Example 1, further including the following steps. Optionally, the determining the special effect preview image according to the target element includes: invoking, for each target element, an element control method corresponding to the target element by using a display start moment of the target element as an actual parameter, and controlling the target element to be displayed in a target effect to obtain the special effect preview image.

According to one or more embodiments of the present disclosure, Example 9 provides a special effect processing apparatus, including: a special effect preview triggering module configured to: display a special effect preview interface in response to an effect preview triggering operation for a target special effect, where the special effect preview interface at least includes a time setting item, and the time setting item is used to set a preview moment of the target special effect; and a special effect preview module configured to determine a special effect preview image according to a set preview moment and the target special effect, and display the special effect preview image, in response to a time setting triggering operation according to the time setting item.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A special effect processing method, comprising:

displaying a special effect preview interface, in response to an effect preview triggering operation for a current special effect, wherein the special effect preview interface at least comprises a time setting item, and the time setting item is used to set a preview moment of the current special effect; and in response to a time setting triggering operation based on the time setting item, determining a special effect preview image according to a set preview moment and the current special effect, and displaying the special effect preview image;

wherein the determining a special effect preview image according to a set preview moment and the current special effect, and displaying the special effect preview image, comprises:

executing special effect processing logic of the current special effect from a special effect start moment, and displaying the special effect preview image when the set preview moment is reached;

wherein the current special effect comprises at least one special effect element, and the executing special effect processing logic of the current special effect from a special effect start moment, comprises:

determining the special effect start moment, a display start moment of each special effect element, a display end moment of each special effect element and the preview moment as segmentation points, and using a time length between every two adjacent segmentation points as a time increment, and invoking, starting from the special effect start moment, a predefined display control method at each interval of the time increment to control a special effect element corresponding to the time increment to present a current display effect.

2. The special effect processing method according to claim 1, wherein the displaying the special effect preview image when the set preview moment is reached, comprises:

determining current special effect simulation duration of the current special effect according to the preview moment, and determining actual special effect simulation duration of the current special effect according to the time increment; and displaying the special effect preview image corresponding to the current special effect when the actual special effect simulation duration reaches the current special effect simulation duration.

3. The special effect processing method according to claim 1, wherein before the determining the special effect start moment, a display start moment of each special effect element, a display end moment of each special effect element and the preview moment as segmentation points, the special effect processing method further comprises:

determining the display start moment of each special effect element and the display end moment of each special effect element respectively according to a field corresponding to each special effect element.

4. The special effect processing method according to claim 1, wherein the at least one special effect element comprises a first element and a second element, the second element is displayed in association with the first element;

the predefined display control method comprises a first control method and a second control method; and the invoking a predefined display control method to control a special effect element corresponding to the time increment to present a current display effect, comprises:

invoking the first control method to control a first display effect of the first element, and invoking the second control method to control a second display effect of the second element, to obtain the current display effect, wherein an execution timing of the first control method and the second control method is determined according to an association display manner of the second element and the first element.

5. The special effect processing method according to claim 1, wherein the current special effect comprises at least one special effect element;

and the determining a special effect preview image according to a set preview moment and the current special effect, comprises:

determining a to-be-displayed special effect element at the set preview moment for the current special effect, using the to-be-displayed special effect element as a current element, and determining the special effect preview image according to the current element.

6. The special effect processing method according to claim 5, wherein the determining the special effect preview image according to the current element, comprises:

invoking, for each current element, an element control method corresponding to the current element by using a display start moment of the current element as an actual parameter, and controlling the current element to be displayed in a current effect to obtain the special effect preview image.

7. An electronic device, comprising:

one or more processors; and a memory, configured to store one or more programs, wherein when the one or more programs are executed by the one or more processors, the one or more processors are caused to implement a special effect processing method, and the special effect processing method comprises:

displaying a special effect preview interface, in response to an effect preview triggering operation for a current special effect, wherein the special effect preview interface at least comprises a time setting item, and the time setting item is used to set a preview moment of the current special effect; and in response to a time setting triggering operation based on the time setting item, determining a special effect preview image according to a set preview moment and the current special effect, and displaying the special effect preview image;

wherein the determining a special effect preview image according to a set preview moment and the current special effect, and displaying the special effect preview image, comprises: executing special effect processing logic of the current special effect from a special effect start moment, and displaying the special effect preview image when the set preview moment is reached;

wherein the current special effect comprises at least one special effect element, and the executing special effect processing logic of the current special effect from a special effect start moment, comprises:

determining the special effect start moment, a display start moment of each special effect element, a display end moment of each special effect element and the preview moment as segmentation points, and using a time length between every two adjacent segmentation points as a time increment, and invoking, starting from the special effect start moment, a predefined display control method at each interval of the time increment to control a special effect element corresponding to the time increment to present a current display effect.

8. The electronic device according to claim 7, wherein the displaying the special effect preview image when the set preview moment is reached, comprises:

determining current special effect simulation duration of the current special effect according to the preview moment, and determining actual special effect simulation duration of the current special effect according to the time increment; and displaying the special effect preview image corresponding to the current special effect when the actual special effect simulation duration reaches the current special effect simulation duration.

9. The electronic device according to claim 7, wherein before the determining the special effect start moment, a display start moment of each special effect element, a display end moment of each special effect element and the preview moment as segmentation points, the special effect processing method further comprises:

determining the display start moment of each special effect element and the display end moment of each special effect element respectively according to a current field corresponding to each special effect element.

10. The electronic device according to claim 7, wherein the at least one special effect element comprises a first element and a second element, the second element is displayed in association with the first element; the predefined display control method comprises a first control method and a second control method;

and the invoking a predefined display control method to control a special effect element corresponding to the time increment to present a current display effect, comprises:

invoking the first control method to control a first display effect of the first element, and invoking the second control method to control a second display effect of the second element, to obtain the current display effect, wherein an execution timing of the first control method and the second control method is determined according to an association display manner of the second element and the first element.

11. A non-transitory storage medium, comprising computer-executable instructions, wherein when the computer-executable instructions are executed by a computer processor, the computer-executable instructions are used to perform a special effect processing method, and the special effect processing method comprises:

displaying a special effect preview interface, in response to an effect preview triggering operation for a current special effect, wherein the special effect preview interface at least comprises a time setting item, and the time setting item is used to set a preview moment of the current special effect; and in response to a time setting triggering operation based on the time setting item, determining a special effect preview image according to a set preview moment and the current special effect, and displaying the special effect preview image;

wherein the determining a special effect preview image according to a set preview moment and the current special effect, and displaying the special effect preview image, comprises: executing special effect processing logic of the current special effect from a special effect start moment, and displaying the special effect preview image when the set preview moment is reached;

wherein the current special effect comprises at least one special effect element, and the executing special effect processing logic of the current special effect from a special effect start moment, comprises:

determining the special effect start moment, a display start moment of each special effect element, a display end moment of each special effect element and the preview moment as segmentation points, and using a time length between every two adjacent segmentation points as a time increment, and invoking, starting from the special effect start moment, a predefined display control method at each interval of the time increment to control a special effect element corresponding to the time increment to present a current display effect.

12. The non-transitory storage medium according to claim 11, wherein the displaying the special effect preview image when the set preview moment is reached, comprises:

determining current special effect simulation duration of the current special effect according to the preview moment, and determining actual special effect simulation duration of the current special effect according to the time increment; and displaying the special effect preview image corresponding to the current special effect when the actual special effect simulation duration reaches the current special effect simulation duration.

13. The non-transitory storage medium according to claim 11, wherein before the determining the special effect start moment, a display start moment of each special effect element, a display end moment of each special effect element and the preview moment as segmentation points, the special effect processing method further comprises:

determining the display start moment of each special effect element and the display end moment of each special effect element respectively according to a current field corresponding to each special effect element.

14. The non-transitory storage medium according to claim 11, wherein the at least one special effect element comprises a first element and a second element, the second element is displayed in association with the first element;

the predefined display control method comprises a first control method and a second control method; and the invoking a predefined display control method to control a special effect element corresponding to the time increment to present a current display effect, comprises:

invoking the first control method to control a first display effect of the first element, and invoking the second control method to control a second display effect of the second element, to obtain the current display effect, wherein an execution timing of the first control method and the second control method is determined according to an association display manner of the second element and the first element.

* * * * *